(12) United States Patent
Bae et al.

(10) Patent No.: US 9,040,641 B2
(45) Date of Patent: May 26, 2015

(54) POLYCARBONATE-POLYSILOXANE COPOLYMER, AND METHOD FOR PREPARING SAME

(71) Applicant: Cheil Industries Inc., Gumi-si (KR)

(72) Inventors: Jin Yong Bae, Uiwang-si (KR); Mie Ock Kim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/927,232

(22) Filed: Jun. 26, 2013

(65) Prior Publication Data

US 2013/0289224 A1 Oct. 31, 2013

Related U.S. Application Data

(63) Continuation-in-part of application No. PCT/KR2011/009307, filed on Dec. 2, 2011.

(30) Foreign Application Priority Data

Dec. 30, 2010 (KR) ........................ 10-2010-0139498

(51) Int. Cl.
| | |
|---|---|
| *C08G 77/38* | (2006.01) |
| *C08G 63/16* | (2006.01) |
| *C08G 63/64* | (2006.01) |
| *C08G 63/181* | (2006.01) |
| *C08G 63/195* | (2006.01) |
| *C08G 64/18* | (2006.01) |
| *C08G 77/448* | (2006.01) |
| *C08G 77/14* | (2006.01) |

(52) U.S. Cl.
CPC .............. *C08G 77/38* (2013.01); *C08G 64/186* (2013.01); *C08G 77/448* (2013.01); *C08G 77/14* (2013.01)

(58) Field of Classification Search
CPC ........ C08G 77/38; C08G 63/16; C08G 63/64; C08G 63/181; C08G 63/195
See application file for complete search history.

(56) References Cited

U.S. PATENT DOCUMENTS

| | | | | |
|---|---|---|---|---|
| 3,189,662 | A | * | 6/1965 | Vaughn, Jr. ................... 528/33 |
| 3,213,059 | A | * | 10/1965 | Deanin et al. ................ 528/196 |
| 3,419,634 | A | * | 12/1968 | Vaughn, Jr. ................... 528/29 |
| 3,419,635 | A | * | 12/1968 | Vaughn, Jr. ................... 528/29 |
| 4,188,314 | A | | 2/1980 | Fox et al. |
| 4,634,737 | A | | 1/1987 | Liu et al. |
| 4,895,965 | A | | 1/1990 | Langer |
| 4,945,147 | A | * | 7/1990 | Policastro et al. ............. 528/26 |
| 4,945,148 | A | * | 7/1990 | Rich et al. ..................... 528/26 |
| 4,994,532 | A | * | 2/1991 | Hawkins et al. .............. 525/464 |
| 5,214,118 | A | * | 5/1993 | Hawkins et al. ............... 528/26 |
| 6,833,422 | B2 | * | 12/2004 | Silva et al. .................... 528/29 |
| 7,498,388 | B2 | | 3/2009 | Davis et al. |
| 8,138,295 | B2 | | 3/2012 | Kim et al. |
| 2005/0101757 | A1 | | 5/2005 | Glasgow et al. |
| 2005/0187372 | A1 | | 8/2005 | Venderbosch et al. |

FOREIGN PATENT DOCUMENTS

| | | |
|---|---|---|
| KR | 10-0833957 B1 | 5/2008 |
| WO | 2007-121038 A1 | 10/2007 |
| WO | 2008-082220 A1 | 7/2008 |
| WO | 2012/091308 A2 | 7/2012 |

OTHER PUBLICATIONS

Riffle et al. "Interfacial Synthesis Part II: Phase-Transfer Catalyzed Synthesis of Polycarbonate/Polysiloxane Block Copolymers" J. Macromol. Sci.-Chem., A15(5), 967-998, 1981.*
International Search Report in counterpart International Application No. PCT/KR2011/009307 dated Jul. 30, 2012, pp. 1-4.
European Search Report in counterpart European Application No. 11854149.9 dated Jun. 6, 2014, pp. 1-6.
Office Action in counterpart Chinese Application No. 201180063755.0 dated May 13, 2014, pp. 1-6.

* cited by examiner

*Primary Examiner* — Robert S Loewe
(74) *Attorney, Agent, or Firm* — Additon, Higgins & Pendleton, P.A.

(57) ABSTRACT

A polycarbonate-polysiloxane copolymer includes a polysiloxane unit. The polycarbonate-polysiloxane copolymer can have superior melt flowability and ductility while maintaining high transparency and low haze.

13 Claims, No Drawings

POLYCARBONATE-POLYSILOXANE COPOLYMER, AND METHOD FOR PREPARING SAME

CROSS-REFERENCE TO RELATED APPLICATIONS

This application is a continuation-in-part of International Application No. PCT/KR2011/009307, filed Dec. 2, 2011, pending, which designates the U.S., published as WO 2012/091308, and is incorporated herein by reference in its entirety, and claims priority therefrom under 35 USC Section 120. This application also claims priority under 35 USC Section 119 to and the benefit of Korean Patent Application No. 10-2010-0139498, filed Dec. 30, 2010, the entire disclosure of which is incorporated herein by reference.

FIELD OF THE INVENTION

The present invention relates to a polycarbonate-polysiloxane copolymer and a method for preparing the same.

BACKGROUND OF THE INVENTION

Polycarbonates are transparent thermoplastic high-performance plastic materials with desirable mechanical, optical, thermal and electrical properties. However, polycarbonates have a disadvantage of poor chemical resistance and are required to have a higher level of impact strength for use in various applications.

Various proposals have been made to improve the mechanical properties of polycarbonates. As an example, blending of polycarbonates with other materials has been proposed. However, this approach can cause deterioration of transparency inherent to polycarbonates. In many actual cases, polycarbonates lose their transparency even when small amounts of rubbery impact modifiers are added.

There is also a growing demand for plastics with unique colors and appearances. Thus there is also a need to develop polycarbonates that control the transparency of polymer matrices and do not undergo deterioration of physical properties, such as transparency and impact resistance, despite the use of visual effect additives.

In addition, numerous studies have been conducted to overcome the limited chemical resistance of polycarbonate resins. These studies are based on the problem that when polycarbonate resins are used as exterior materials of electrical/electronic products, diluent solvents of coating materials permeate the polycarbonate resins during coating to cause deterioration of mechanical properties. In order to solve this problem, efforts have been made to improve the physical properties of polycarbonates by blending with other thermoplastic resins. Such technical attempts are advantageous in achieving improved chemical resistance of polycarbonates but fail to ensure impact resistance or transparency thereof.

For example, U.S. Pat. No. 4,188,314 discloses a shaped article with improved chemical resistance that includes a polycarbonate and a copolyester. However, sufficient impact strength of the shaped article cannot be obtained. U.S. Pat. No. 4,634,737 discloses a resin composition including a copolyester-carbonate containing from 25 to 90 mole % ester bonds and an olefin acrylate copolymer. This composition has improved chemical resistance but is very low in transparency.

A number of investigations into the use of siloxane monomers have been conducted to increase the chemical resistance and impact strength of polycarbonates. However, a major problem is that the combination of polycarbonates and siloxane monomers causes a considerable reduction in transparency, one of the greatest advantages of polycarbonates, due to lack of compatibility between the polycarbonates and the siloxane monomers.

Thus, there is still a need for a copolymer including carbonate units and siloxane units that has excellent melt flow and ductility characteristics while maintaining high transparency and low haze.

SUMMARY OF THE INVENTION

The present invention provides a polycarbonate-polysiloxane copolymer that can have excellent melt flow and ductility characteristics while maintaining high transparency and low haze, and a method for preparing the copolymer. The polycarbonate-polysiloxane copolymer can also have a good balance of transparency, chemical resistance and mechanical strength.

The polycarbonate-polysiloxane copolymer includes a polysiloxane unit represented by Formula 1:

[Formula 1]

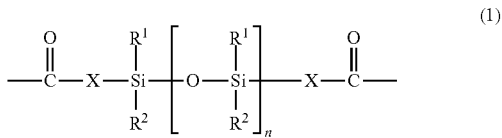

(1)

wherein $R^1$ and $R^2$ are the same or different and are each independently $C_1$-$C_{10}$ alkyl, $C_6$-$C_{18}$ aryl, halogenated and/or $C_1$-$C_{10}$ alkoxylated $C_1$-$C_{10}$ alkyl, or halogenated and/or $C_1$-$C_{10}$ alkoxylated $C_6$-$C_{18}$ aryl, each X is the same or different and each is independently $C_1$-$C_{20}$ alkylene or $C_6$-$C_{18}$ arylene, and n is an integer from 20 to 100.

In exemplary embodiments, X in Formula 1 is $C_1$-$C_{20}$ alkylene.

The amount of the polysiloxane unit in the polycarbonate-polysiloxane copolymer may be from about 0.1 to about 20.0% by weight.

In one embodiment, the polycarbonate-polysiloxane copolymer can have a haze of about 8% or less and a transmittance of about 75% or more as measured at a thickness of 3 mm, a ⅛" Izod impact strength of about 70 kgf·cm/cm or more as measured at room temperature by ASTM D256, and a ⅛" Izod impact strength of about 55 kgf·cm/cm or more as measured at −30° C. by ASTM D256.

The present invention further provides a method for preparing the polycarbonate-polysiloxane copolymer. The method includes adding an aromatic dihydroxy compound and phosgene to a polysiloxane represented by Formula 2:

[Formula 2]

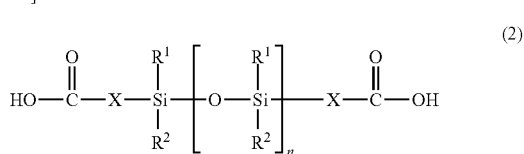

(2)

wherein $R^1$ and $R^2$ are the same or different and are each independently $C_1$-$C_{10}$ alkyl, $C_6$-$C_{18}$ aryl, halogenated and/or $C_1$-$C_{10}$ alkoxylated $C_1$-$C_{10}$ alkyl, or halogenated and/or $C_1$-$C_{10}$ alkoxylated $C_6$-$C_{18}$ aryl, each X is the same or different and each is independently $C_1$-$C_{20}$ alkylene or $C_6$-$C_{18}$ arylene, and n is an integer from 20 to 100, and polymerizing the mixture.

The aromatic dihydroxy compound may be added in an amount of about 80.0 to about 99.9 parts by weight with respect to about 0.1 to about 20.0 parts by weight of the polysiloxane.

In one embodiment, the aromatic dihydroxy compound and the phosgene may be added in two divided portions.

The polycarbonate-polysiloxane copolymer of the present invention can have excellent melt flow and ductility characteristics while maintaining high transparency and low haze. In addition, the polycarbonate-polysiloxane copolymer of the present invention can have a good balance of transparency, chemical resistance, and mechanical strength. The method of the present invention is suitable for preparing the polycarbonate-polysiloxane copolymer.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a polycarbonate-polysiloxane copolymer including a polysiloxane unit represented by Formula 1:

[Formula 1]

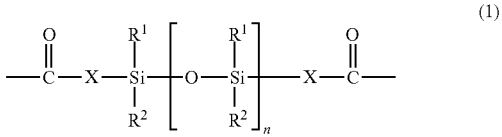

(1)

wherein $R^1$ and $R^2$ are the same or different and are each independently $C_1$-$C_{10}$ alkyl, $C_6$-$C_{18}$ aryl, halogenated and/or $C_1$-$C_{10}$ alkoxylated $C_1$-$C_{10}$ alkyl, or halogenated and/or $C_1$-$C_{10}$ alkoxylated $C_6$-$C_{18}$ aryl, each X is the same or different and each is independently $C_1$-$C_{20}$ alkylene or $C_6$-$C_{18}$ arylene, and n is an integer from 20 to 100.

As used herein, alkoxylated $C_1$-$C_{10}$ alkyl or $C_6$-$C_{18}$ aryl refers to $C_1$-$C_{10}$ alkoxylated $C_1$-$C_{10}$ alkyl or $C_6$-$C_{18}$ aryl.

In exemplary embodiments, each X in Formula 1 is independently $C_1$-$C_{20}$ alkylene. In one embodiment, each X in Formula 1 may independently be $C_6$-$C_{12}$ alkylene. In exemplary embodiments, each X in Formula 1 may independently be linear or branched alkylene or arylene, for example linear alkylene or arylene.

n in Formula 2 is an integer from about 20 to about 100, for example from about 25 to about 80, and as another example about 30 to about 60. When n is an integer within this range, high transparency can be obtained.

The polycarbonate-polysiloxane copolymer can include the polysiloxane unit of Formula 1 in the main chain of the polycarbonate-polysiloxane copolymer. The polycarbonate-polysiloxane copolymer can include the polysiloxane unit of Formula 1 in an amount of about 0.1 to about 20.0% by weight, for example about 5.0 to about 15.0% by weight, based on the total weight of the polycarbonate-polysiloxane copolymer. In some embodiments, the polycarbonate-polysiloxane copolymer can include the polysiloxane unit of Formula 1 in an amount of in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20% by weight. Further, according to some embodiments of the present invention, the amount of the polysiloxane unit of Formula 1 can be in a range from about any of the foregoing amounts to about any other of the foregoing amounts.

When the polycarbonate-polysiloxane copolymer includes the polysiloxane unit of Formula 1 in an amount within this range, high transparency can be obtained.

In another aspect of the present invention, a method for preparing the polycarbonate-polysiloxane copolymer includes adding an aromatic dihydroxy compound and phosgene to a polysiloxane represented by Formula 2:

[Formula 2]

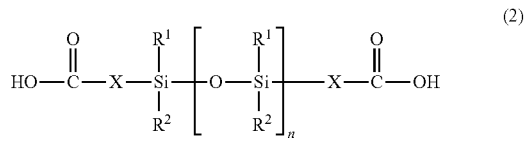

(2)

wherein $R^1$ and $R^2$ are the same or different and are each independently $C_1$-$C_{10}$ alkyl, $C_6$-$C_{18}$ aryl, halogenated and/or $C_1$-$C_{10}$ alkoxylated $C_1$-$C_{10}$ alkyl, or halogenated and/or $C_1$-$C_{10}$ $C_6$-$C_{18}$ aryl, each X is the same or different and each is independently $C_1$-$C_{20}$ alkylene or $C_6$-$C_{18}$ arylene, and n is an integer from 20 to 100, and polymerizing the mixture.

The aromatic dihydroxy compound may be added in an amount of about 80.0 to about 99.9 parts by weight with respect to about 0.1 to about 20.0 parts by weight of the polysiloxane. Within this range, high transparency can be obtained.

In some embodiments, the aromatic dihydroxy compound may be added in an amount of about 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, or 99.9 parts by weight. Further, according to some embodiments of the present invention, the amount of the aromatic dihydroxy compound can be in a range from about any of the foregoing amounts to about any other of the foregoing amounts.

In some embodiments, the polysiloxane may be added in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 parts by weight. Further, according to some embodiments of the present invention, the amount of the polysiloxane can be in a range from about any of the foregoing amounts to about any other of the foregoing amounts.

The aromatic dihydroxy compound may be represented by Formula 3:

[Formula 3]

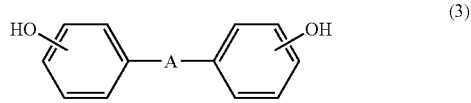

(3)

wherein A represents a single bond or is $C_1$-$C_5$ alkylene, $C_1$-$C_5$ alkylidene, $C_5$-$C_6$ cycloalkylidene, —S—, or —$SO_2$—.

Specific examples of the aromatic dihydroxy compound of Formula 3 include, but are not necessarily limited to, 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and combinations thereof. Among these, 2,2-bis(4-hydroxyphenyl)propane, 2,2-bis(3,5-dichloro-4-hydroxyphenyl)propane, and/or 1,1-bis(4-hydroxyphenyl)cyclohexane can be used, for example, 2,2-bis(4-hydroxyphenyl)propane, also called bisphenol-A, can be used.

In one embodiment, the polycarbonate-polysiloxane copolymer may be prepared by adding the polysiloxane represented by Formula 2 to an organic solvent, adding a basic solution to the mixture to maintain a pH of about 4 to about 7, adding the aromatic dihydroxy compound and phosgene, adding a basic solution to maintain a pH of about 10 to about 11, followed by interfacial polymerization.

In this embodiment, the aromatic dihydroxy compound and the phosgene can be added in two divided portions.

The polycarbonate-polysiloxane copolymer thus prepared includes the unit of Formula 1 in the main chain thereof and can have excellent transparency, mechanical properties and chemical resistance.

In one embodiment, the polycarbonate-polysiloxane copolymer may have a haze of about 8% or less and a transmittance of about 75% or more as measured at a thickness of 3 mm, a ⅛" Izod impact strength of about 70 kgf·cm/cm or more as measured at room temperature by ASTM D256, and a ⅛" Izod impact strength of about 55 kgf·cm/cm or more as measured at −30° C. by ASTM D256.

For example, the polycarbonate-polysiloxane copolymer can have a haze of about 0.1% to about 2.0% and a transmittance of about 85% to about 90% as measured at a thickness of 3 mm, a ¼" Izod impact strength of about 50.0 kgf·cm/cm or more as measured at room temperature (25° C.) by ASTM D256, and a tensile strength retention of about 88.0% to about 99.0% after dipping in gasoline for 7 days.

The present invention will be better understood from the following examples. These examples are provided for illustrative purposes and are not intended to limit the scope of the invention defined by the appended claims.

EXAMPLE 1

2 L of methylene chloride and 1 L of distilled water are filled in a reactor, and methyltributylammonium chloride (15.2 g) is added thereto. To the solution is added the siloxane polymer (112.7 g) represented by Formula 2-1 wherein m is 8 and n is 40. Thereafter, a solution of triphosgene (13.4 g) in 0.5 L of methylene chloride is further added to the reactor with vigorous stirring, and then a NaOH solution is added to maintain a pH of 4-7. The temperature is maintained at 20-25° C. After the pH is stably maintained at 4-7 by the addition of the NaOH solution, 1 L of methylene chloride and 0.5 L of distilled water are further added, followed by the addition of a solution of triethylamine (10.0 g) in 0.25 L of methylene chloride. Thereafter, 2,2-bis(4-hydroxyphenyl)propane (BPA) (228.3 g) and triphosgene (108.8 g) are added to the reactor, and then a NaOH solution is added to maintain a pH of 10-11. The temperature is maintained at 20-25° C. After the pH is stably maintained at 10-11 by the addition of the NaOH solution, 1 L of methylene chloride and 0.5 L of distilled water are further added, followed by the addition of a solution of para-cumylphenol (38.0 g) in 0.25 L of methylene chloride. Thereafter, 2,2-bis(4-hydroxyphenyl)propane (BPA) (913.2 g) and triphosgene (445.0 g) are added to the reactor, and then a NaOH solution is added to maintain a pH of 10-11. The temperature is maintained at 20-25° C. After the pH is stably maintained at 10-11 by the addition of the NaOH solution, stirring is continued for 1 hr. After completion of the stirring, the organic layer is separated, neutralized with 2 L of a 10% HCl solution, and washed several times with water until neutrality. After a portion of the solvent is removed from the organic layer, methanol is used to precipitate the polymerization product. The precipitate is filtered and dried to obtain the polymerization product in the form of a powder. DOSY analysis of the polymer reveals the presence of the silicone polymer bonded to (incorporated into) the main chain of the polycarbonate. The polymer is found to have a Si content of 2.30 wt % by $^1$H NMR analysis and to have a Mw of 22,148 g/mol by GPC analysis.

[Formula 2-1]

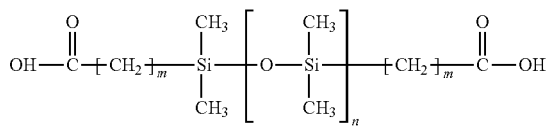

(2-1)

EXAMPLE 2

The procedure of Example 1 is repeated, except that the siloxane polymer (116.5 g) of Formula 2-1 wherein m is 12 and n is 40 is added. DOSY analysis of the final polymer reveals the presence of the silicone polymer bonded to (incorporated into) the main chain of the polycarbonate. The polymer is found to have a Si content of 2.28 wt % by $^1$H NMR analysis and to have a Mw of 22,206 g/mol by GPC analysis.

EXAMPLE 3

The procedure of Example 1 is repeated, except that the siloxane polymer (131.5 g) of Formula 2-1 wherein m is 8 and n is 40 is added. DOSY analysis of the final polymer reveals the presence of the silicone polymer bonded to (incorporated into) the main chain of the polycarbonate. The polymer is found to have a Si content of 2.85 wt % by $^1$H NMR analysis and to have a Mw of 21,634 g/mol by GPC analysis.

EXAMPLE 4

The procedure of Example 1 is repeated, except that the siloxane polymer (135.9 g) of Formula 2-1 wherein m is 12 and n is 40 is added. DOSY analysis of the final polymer reveals the presence of the silicone polymer bonded to (incorporated into) the main chain of the polycarbonate. The polymer is was found to have a Si content of 2.86 wt % by $^1$H NMR analysis and to have a Mw of 22,038 g/mol by GPC analysis.

EXAMPLE 5

The procedure of Example 1 is repeated, except that the siloxane polymer (155.3 g) of Formula 2-1 wherein m is 8 and n is 40 is added. DOSY analysis of the final polymer reveals the presence of the silicone polymer bonded to (incorporated into) the main chain of the polycarbonate. The polymer is found to have a Si content of 3.24 wt % by $^1$H NMR analysis and to have a Mw of 21,109 g/mol by GPC analysis.

EXAMPLE 6

The procedure of Example 1 is repeated, except that the siloxane polymer (174.7 g) of Formula 2-1 wherein m is 8 and n is 40 is added. DOSY analysis of the final polymer reveals the presence of the silicone polymer bonded to (incorporated into) the main chain of the polycarbonate. The polymer is found to have a Si content of 3.59 wt % by $^1$H NMR analysis and to have a Mw of 20,751 g/mol by GPC analysis.

EXAMPLE 7

The procedure of Example 1 is repeated, except that the siloxane polymer (101.7 g) of Formula 2-1 wherein m is 8 and n is 60 is added. DOSY analysis of the final polymer reveals the presence of the silicone polymer bonded to (incorporated into) the main chain of the polycarbonate. The polymer is found to have a Si content of 2.25 wt % by $^1$H NMR analysis and to have a Mw of 22,168 g/mol by GPC analysis.

EXAMPLE 8

The procedure of Example 1 is repeated, except that the siloxane polymer (111.2 g) of Formula 2-1 wherein m is 12 and n is 60 is added. DOSY analysis of the final polymer reveals the presence of the silicone polymer bonded to (incorporated into) the main chain of the polycarbonate. The polymer is found to have a Si content of 2.22 wt % by $^1$H NMR analysis and to have a Mw of 22,648 g/mol by GPC analysis.

EXAMPLE 9

The procedure of Example 1 is repeated, except that the siloxane polymer (106.7 g) of Formula 2-1 wherein m is 8 and n is 80 is added. DOSY analysis of the final polymer reveals the presence of the silicone polymer bonded to (incorporated into) the main chain of the polycarbonate. The polymer is found to have a Si content of 2.26 wt % by $^1$H NMR analysis and to have a Mw of 21,597 g/mol by GPC analysis.

EXAMPLE 10

The procedure of Example 1 is repeated, except that the siloxane polymer (108.6 g) of Formula 2-1 wherein m is 12 and n is 80 is added. DOSY analysis of the final polymer reveals the presence of the silicone polymer bonded to (incorporated into) the main chain of the polycarbonate. The polymer is found to have a Si content of 2.28 wt % by $^1$H NMR analysis and to have a Mw of 22,064 g/mol by GPC analysis.

COMPARATIVE EXAMPLE 1

The procedure of Example 1 is repeated, except that the siloxane polymer of Formula 4 wherein each $R^1$ and $R^2$ is $CH_3$, each Z is $CH_3O$, each Y is $—(CH_2)_3—$, and k is 50 and whose terminal structures is derived from eugenol is used.

[Formula 4]

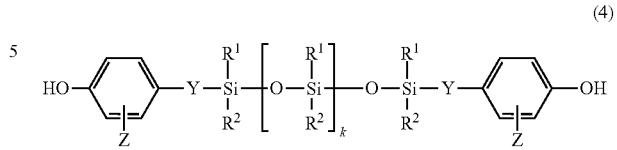

(4)

DOSY analysis of the final polymer reveals the presence of the silicone polymer bonded to (incorporated into) the main chain of the polycarbonate. The polymer is found to have a Si content of 2.27 wt % by $^1$H NMR analysis and to have a Mw of 21,457 g/mol by GPC analysis.

COMPARATIVE EXAMPLE 2

3 L of methylene chloride and 1.5 L of distilled water are filled in a reactor, and methyltributylammonium chloride (15.2 g) is added thereto. To the solution is added a solution of triethylamine (10.0 g) in 0.25 L of methylene chloride. Thereafter, 2,2-bis(4-hydroxyphenyl)propane (BPA) (228.3 g) and triphosgene (108.8 g) are added to the reactor, and then a NaOH solution is added to maintain a pH of 10-11. The temperature is maintained at 20-25° C. After the pH is stably maintained at 10-11 by the addition of the NaOH solution, 1 L of methylene chloride and 0.5 L of distilled water are further added, followed by the addition of a solution of para-cumylphenol (38.0 g) in 0.25 L of methylene chloride. Thereafter, 2,2-bis(4-hydroxyphenyl)propane (BPA) (913.2 g) and triphosgene (445.0 g) are added to the reactor, and then a NaOH solution is added to maintain a pH of 10-11. The temperature is maintained at 20-25° C. After the pH is stably maintained at 10-11 by the addition of the NaOH solution, stirring is continued for 1 hr. After completion of the stirring, the organic layer is separated, neutralized with 2 L of a 10% HCl solution, and washed several times with water until neutrality. After a portion of the solvent is removed from the organic layer, methanol is used to precipitate the polymerization product. The precipitate is filtered and dried to obtain the polymerization product in the form of a powder. As a result of GPC analysis, the polymer is found to have a Mw of 22,765 g/mol.

COMPARATIVE EXAMPLE 3

A polycarbonate (SC-1190, Cheil Industries Inc.), which is not copolymerized with siloxane, is evaluated and analyzed.

After drying at 120° C. for 4 hr, the polymers of Examples 1-10 and Comparative Examples 1-3 are injected using a 10 Oz injection molding machine to produce 3 mm thick specimens. The injection molding is performed at a molding temperature of 290° C. and a die temperature of 70° C. The physical properties of the specimens are measured by the following methods.

Methods for Evaluation of Physical Properties (1) Haze and transmittance values of the 3 mm thick specimens are measured using a haze meter (YDPO2-0D, NIPPON DENSHOKU).

(2) Impact resistance (kgf·cm/cm) is evaluated using ⅛" thick notched Izod specimens and ¼" thick notched Izod specimens at 25° C. and −30° C. respectively according to ASTM D256.

(3) Chemical resistance is evaluated by measuring changes in the tensile strength of ASTM No. 1 dumb-bell specimens after dipping in gasoline for 7 days.

The measurement results are shown in Table 1.

TABLE 1

|  | m | n | Si content (wt %) | Molecular weight ($M_W$) | Haze (%) | Transmittance (%) | ¼" Izod impact strength (room temp.) | ⅛" Izod impact strength (room temp.) | ⅛" Izod impact strength (−30° C.) | Tensile strength retention after dipping (%) |
|---|---|---|---|---|---|---|---|---|---|---|
| Example 1 | 8 | 40 | 2.30 | 22,148 | 1.05 | 88.2 | 53.8 | 73.6 | 61.2 | 88.7 |
| Example 2 | 12 | 40 | 2.28 | 22,206 | 1.04 | 88.3 | 52.6 | 74.2 | 61.7 | 88.5 |
| Example 3 | 8 | 40 | 2.85 | 21,634 | 1.61 | 87.0 | 59.3 | 76.5 | 62.9 | 91.0 |
| Example 4 | 12 | 40 | 2.86 | 22,038 | 1.62 | 86.8 | 58.8 | 77.1 | 62.6 | 91.2 |
| Example 5 | 8 | 40 | 3.24 | 21,109 | 3.78 | 84.3 | 61.9 | 80.7 | 60.6 | 93.2 |
| Example 6 | 8 | 40 | 3.59 | 20,751 | 7.32 | 82.6 | 63.2 | 82.2 | 59.9 | 94.6 |
| Example 7 | 8 | 60 | 2.25 | 22,168 | 1.54 | 87.6 | 59.4 | 78.9 | 64.2 | 92.4 |
| Example 8 | 12 | 60 | 2.22 | 22,684 | 1.57 | 87.5 | 59.1 | 79.3 | 63.8 | 92.5 |
| Example 9 | 8 | 80 | 2.26 | 21,597 | 7.62 | 77.4 | 63.4 | 82.6 | 73.8 | 93.7 |
| Example 10 | 12 | 80 | 2.28 | 22,064 | 7.56 | 77.8 | 63.8 | 82.1 | 73.6 | 94.1 |
| Comparative Example 1 | — | — | 2.27 | 21,457 | 2.46 | 83.6 | 53.1 | 61.8 | 51.3 | 88.4 |

From the results in Table 1, it can be confirmed that the copolymers of Examples 1-4 have better transparency, impact strength and chemical resistance than the copolymer of Comparative Example 1.

TABLE 2

|  | Si content (wt %) | Molecular weight ($M_W$) | ¼" Izod impact strength (room temp.) | ⅛" Izod impact strength (room temp.) | ⅛" Izod impact strength (−30° C.) | Tensile strength retention after dipping (%) |
|---|---|---|---|---|---|---|
| Example 1 | 2.30 | 22,148 | 53.8 | 73.6 | 61.2 | 88.7 |
| Example 2 | 2.28 | 22,206 | 52.6 | 74.2 | 61.7 | 88.5 |
| Example 3 | 2.85 | 21,634 | 59.3 | 76.5 | 62.9 | 91.0 |
| Example 4 | 2.86 | 22,038 | 58.8 | 77.1 | 62.6 | 91.2 |
| Example 5 | 3.24 | 21,109 | 61.9 | 80.7 | 60.6 | 93.2 |
| Example 6 | 3.59 | 20,751 | 63.2 | 82.2 | 59.9 | 94.6 |
| Example 7 | 2.25 | 22,168 | 59.4 | 78.9 | 64.2 | 92.4 |
| Example 8 | 2.22 | 22,684 | 59.1 | 79.3 | 63.8 | 92.5 |
| Example 9 | 2.26 | 21,597 | 63.4 | 82.6 | 73.8 | 93.7 |
| Example 10 | 2.28 | 22,064 | 63.8 | 82.1 | 73.6 | 94.1 |
| Comparative Example 2 | — | 22,457 | 8.1 | 73.2 | 6.3 | 58.4 |
| Comparative Example 3 | — | 22,236 | 6.7 | 71.6 | 6.1 | 56.9 |

As can be seen from the results in Table 2, the impact strength and chemical resistance of the polymers of Examples 1-10 are markedly improved compared to those of the polycarbonate not copolymerized with siloxane.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A polycarbonate-polysiloxane copolymer comprising a polysiloxane unit represented by Formula 1:

[Formula 1]

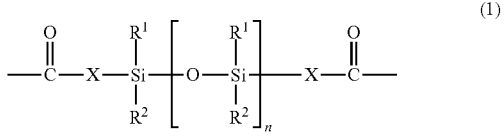

wherein:
R$^1$ and R$^2$ are the same or different and are each independently C$_1$-C$_{10}$ alkyl, C$_6$-C$_{18}$ aryl, halogenated C$_1$-C$_{10}$ alkyl, alkoxylated C$_1$-C$_{10}$ alkyl, halogenated C$_6$-C$_{18}$ aryl or alkoxylated C$_6$-C$_{18}$ aryl, each X is the same or different and each is independently C$_6$-C$_{20}$ alkylene, and n is an integer from 20 to 100.

2. The polycarbonate-polysiloxane copolymer according to claim 1, wherein the polysiloxane unit is present in an amount about 0.1 to about 20.0% by weight, based on the total weight of the polycarbonate-polysiloxane copolymer.

3. The polycarbonate-polysiloxane copolymer according to claim 1, wherein the polycarbonate-polysiloxane copolymer has a haze of about 8% or less and a transmittance of about 75% or more as measured at a thickness of 3 mm, a ⅛" Izod impact strength of about 70 kgf·cm/cm or more as measured at room temperature by ASTM D256, and a ⅛" Izod impact strength of about 55 kgf·cm/cm or more as measured at −30 °C. by ASTM D256.

4. The polycarbonate-polysiloxane copolymer according to claim 1, wherein each X in Formula 1 is independently C$_8$-C$_{20}$ alkylene.

5. The polycarbonate-polysiloxane copolymer according to claim 1, wherein each X in Formula 1 is independently C$_{12}$-C$_{20}$ alkylene.

6. The polycarbonate-polysiloxane copolymer according to claim 1, wherein the polycarbonate-polysiloxane copolymer has a tensile strength retention of about 88.0% to about 99.0% after measuring changes in tensile strength of an ASTM No.1 dumb-bell specimen after dipping in gasoline for 7 days.

7. The polycarbonate-polysiloxane copolymer according to claim 6, wherein the polycarbonate-polysiloxane copolymer has a ⅛" Izod impact strength of 59.9 kg·cm/cm or more as measured at −30 °C. by ASTM D256.

8. A method for preparing a polycarbonate-polysiloxane copolymer, comprising adding an aromatic dihydroxy compound and phosgene to a polysiloxane represented by Formula 2:

[Formula 2]

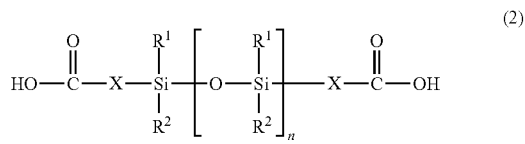

(2)

wherein:
R$^1$ and R$^2$ are the same or different and are each independently C$_1$-C$_{10}$ alkyl, C$_6$-C$_{18}$ aryl, halogenated C$_1$-C$_{10}$ alkyl, alkoxylated C$_1$-C$_{10}$ alkyl, halogenated C$_6$-C$_{18}$ aryl, or alkoxylated C$_6$-C$_{18}$ aryl, each X is the same or different and each is independently C$_6$-C$_{20}$ alkylene or C$_6$-C$_{18}$ arylene, and n is an integer from 20 to 100, and polymerizing the mixture.

9. The method according to claim 8, wherein the aromatic dihydroxy compound is added in an amount of about 80.0 to about 99.9 parts by weight with respect to about 0.1 to about 20.0 parts by weight of the polysiloxane.

10. The method according to claim 8, wherein the aromatic dihydroxy compound and the phosgene are added in two divided portions.

11. The method according to claim 8, wherein each X in Formula 2 is independently C$_6$-C$_{20}$ alkylene.

12. The method according to claim 8, wherein each X in Formula 2 is independently C$_8$-C$_{20}$ alkylene.

13. The method according to claim 8, wherein each X in Formula 2 is independently C$_{12}$-C$_{20}$ alkylene.

\* \* \* \* \*